(12) United States Patent
Wang et al.

(10) Patent No.: US 9,156,955 B2
(45) Date of Patent: Oct. 13, 2015

(54) FORMATION OF LATEX COAGULUM COMPOSITE

(75) Inventors: Ting Wang, Lexington, MA (US); Meng-Jiao Wang, Shanghai (CN); Bernard Mariadass, Port Dickson (MY); Thirunavuc Karasu Govindan, Port Dickson (MY); Anthony das Thiruhelvanthan, Port Dickson (MY); Boon Kwang Lee, Port Dickson (MY); Xuan Zhang, Acton, MA (US)

(73) Assignee: Cabot Corporation, Boston, MA (US)

( * ) Notice: Subject to any disclaimer, the term of this patent is extended or adjusted under 35 U.S.C. 154(b) by 305 days.

(21) Appl. No.: 13/395,488

(22) PCT Filed: Sep. 16, 2010

(86) PCT No.: PCT/US2010/002523
§ 371 (c)(1),
(2), (4) Date: Mar. 12, 2012

(87) PCT Pub. No.: WO2011/034589
PCT Pub. Date: Mar. 24, 2011

(65) Prior Publication Data
US 2012/0172492 A1   Jul. 5, 2012

Related U.S. Application Data

(60) Provisional application No. 61/276,876, filed on Sep. 17, 2009, provisional application No. 61/280,453, filed on Nov. 4, 2009.

(51) Int. Cl.
| | |
|---|---|
| C08J 3/16 | (2006.01) |
| C08J 3/20 | (2006.01) |
| B01F 5/06 | (2006.01) |
| B29B 7/32 | (2006.01) |
| B29B 7/90 | (2006.01) |
| B60C 1/00 | (2006.01) |
| C08C 1/14 | (2006.01) |
| C08J 3/00 | (2006.01) |

(52) U.S. Cl.
CPC ............... *C08J 3/203* (2013.01); *B01F 5/0646* (2013.01); *B01F 5/0653* (2013.01); *B29B 7/325* (2013.01); *B29B 7/90* (2013.01); *B60C 1/0016* (2013.01); *C08C 1/14* (2013.01); *C08J 3/005* (2013.01); *C08J 2307/02* (2013.01); *C08J 2321/02* (2013.01)

(58) Field of Classification Search
CPC .................................. C08C 1/14; C08J 3/203
USPC .............. 524/495, 496, 526; 523/352
See application file for complete search history.

(56) References Cited

U.S. PATENT DOCUMENTS

| | | | |
|---|---|---|---|
| 3,108,982 | A | 10/1963 | Barclay |
| 3,664,978 | A | 5/1972 | Uraneck |
| 4,029,633 | A | 6/1977 | Hagopian et al. |
| 4,271,213 | A | 6/1981 | Grimm et al. |
| 4,375,497 | A | 3/1983 | Sandstrom |
| 4,578,411 | A | 3/1986 | Budd et al. |
| 5,753,742 | A | 5/1998 | Bumanlag |
| 5,977,238 | A | 11/1999 | Labauze |
| 6,013,718 | A | 1/2000 | Cabioch et al. |
| 6,048,923 | A | 4/2000 | Mabry et al. |
| 6,075,084 | A * | 6/2000 | Mabry et al. .................. 524/495 |
| 6,365,663 | B2 | 4/2002 | Mabry et al. |
| 6,503,973 | B2 | 1/2003 | Robert et al. |
| 6,521,691 | B1 | 2/2003 | Agostini et al. |
| 6,548,584 | B1 | 4/2003 | Gorl |
| 6,555,606 | B1 | 4/2003 | Agostini |
| 6,753,375 | B2 | 6/2004 | Agostini |
| 6,800,126 | B2 | 10/2004 | Magnus et al. |
| 6,815,473 | B2 | 11/2004 | Robert et al. |
| 6,841,606 | B2 | 1/2005 | Yanagisawa et al. |
| 6,929,783 | B2 | 8/2005 | Chung et al. |
| 7,105,595 | B2 | 9/2006 | Mabry et al. |
| 7,312,271 | B2 | 12/2007 | Chen et al. |
| 7,407,611 | B2 | 8/2008 | Innerebner et al. |
| 2005/0148723 | A1 | 7/2005 | Kondou |
| 2006/0079608 | A1 | 4/2006 | Chung et al. |
| 2006/0089445 | A1 | 4/2006 | Gandon-Pain |
| 2006/0143938 | A1 | 7/2006 | Karato et al. |
| 2006/0225615 | A1 | 10/2006 | Raman et al. |
| 2006/0281850 | A1 | 12/2006 | Tokunaga et al. |
| 2007/0106014 | A1 | 5/2007 | Kanenari et al. |
| 2007/0173567 | A1 | 7/2007 | Ishino |

FOREIGN PATENT DOCUMENTS

| | | |
|---|---|---|
| CA | 2511365 | 10/1997 |
| EP | 1489102 | 12/2004 |
| EP | 1816144 | 8/2007 |
| EP | 1834980 | 9/2007 |
| JP | 2005-220187 | 8/2005 |
| JP | 2006-152211 | 6/2006 |
| JP | 2006-152212 | 6/2006 |
| JP | 2006169483 | 6/2006 |
| JP | 2006183036 | 7/2006 |
| JP | 2006-213879 | 8/2006 |
| JP | 2006213878 | 8/2006 |
| JP | 2007-154089 | 6/2007 |
| JP | 2007-154095 | 6/2007 |
| WO | WO96/18688 | 7/1996 |
| WO | WO03/050182 | 6/2003 |
| WO | WO2009/099623 | 8/2009 |
| WO | WO2011/034587 | 3/2011 |

OTHER PUBLICATIONS

CCBI product data sheet. No date available.*

(Continued)

*Primary Examiner* — Edward Cain

(57) ABSTRACT

A method of producing a coagulated latex composite. A coagulating mixture of a first elastomer latex and a particulate filler slurry is flowed along a conduit, and a second elastomer latex is introduced into the flow of the coagulating mixture.

19 Claims, 4 Drawing Sheets

(56) References Cited

OTHER PUBLICATIONS

S. Wolff and M.J. Wang, Rubber Chem. Technol, 1992, vol. 65, p. 329.
A.I Medalia, "Electrical Conduction in Carbon Black Composites", Rubber Chemistry and Technology, 1986, vol. 59, p. 432.
International Preliminary Report on Patentability for PCT/US2010/002523, Mailed Mar. 29, 2012.

Office Action for CA2773599, issued on Jan. 30, 2014 by the Canadian Patent Office.

* cited by examiner

FORMATION OF LATEX COAGULUM COMPOSITE

This application is a §371 national phase application of and claims priority to PCT/US2010/002523, filed on Sep. 16, 2010, which claims priority to U.S. Provisional Patent Applications Nos. 61/280,453, filed on Nov. 4, 2009 and 61/276,876, filed on Sep. 17, 2009.

BACKGROUND OF THE INVENTION

1. Field of the Invention

This invention relates to the introduction of additional elastomer latex into a latex coagulum composite.

2. Description of the Related Art

Numerous products of commercial significance are formed of elastomeric compositions wherein particulate filler is dispersed in any of various synthetic elastomers, natural rubber or elastomer blends. Carbon black, for example, is widely used as a reinforcing agent in natural rubber and other elastomers. It is common to produce a masterbatch, that is, a premixture of filler, elastomer and various optional additives, such as extender oil. Carbon black masterbatch is prepared with different grades of commercially available carbon black which vary both in surface area per unit weight and in structure, which describes the size and complexity of aggregates of carbon black formed by the fusion of primary carbon black particles to one another. Numerous products of commercial significance are formed of such elastomeric compositions of carbon black particulate filler dispersed in natural rubber. Such products include, for example, vehicle tires wherein different elastomeric compositions may be used for the tread portion, sidewalls, wire skim and carcass. Other products include, for example, engine mount bushings, conveyor belts, windshield wipers and the like.

There are a variety of methods for producing carbon black masterbatch. In one method, disclosed in U.S. Pat. No. 6,841,606 ("the '606 patent"), a carbon black slurry and an elastomer latex are combined in a vat and then coagulated by the addition of a coagulant, such as an acid. In a variation of this process, disclosed in Japanese Patent Publication No. 2005220187, natural rubber latex is diluted to 20% rubber content (from about 24% rubber) and combined with a protease to cleave amide bonds the non-rubber components of the latex. The cleavage is believed to improve the performance of the final rubber product. In another method, disclosed in U.S. Pat. No. 6,048,923, the contents of which are incorporated by reference herein, a continuous flow of a first fluid including an elastomer latex is fed to the mixing zone of a coagulum reactor. A continuous flow of a second fluid including a carbon black slurry is fed under pressure to the mixing zone to form a mixture with the elastomer latex. The mixing of the two fluids is sufficiently energetic to substantially completely coagulate the elastomer latex with the carbon black prior to a discharge end of the coagulum reactor. As disclosed in U.S. Pat. No. 6,075,084, additional elastomer may be added to the material that emerges from the discharge end of the coagulum reactor. As disclosed in U.S. Pat. No. 6,929,783, the coagulum may then be fed to a dewatering extruder.

At high loadings of carbon black, the coagulum emerges from the coagulum reactor not as a continuous flow of carbon black-elastomer composite but as a plurality of discrete carbon black-elastomer composite regions carried by a substantially coagulum-free aqueous phase. Generally, such a discontinuous material does not pass as easily through the dewatering extruder and can backflow within the dewatering extruder, causing clogging. It is therefore desirable to prepare a continuous flow of coagulum containing a high volume fraction of carbon black that can be more easily handled in an apparatus such as a dewatering extruder.

SUMMARY OF THE INVENTION

In one embodiment, the invention is a method of producing a coagulated latex composite. The method includes flowing a coagulating mixture of a first elastomer latex comprising a first elastomer and a particulate filler slurry along a conduit, and introducing a second elastomer latex comprising a second elastomer into the flow of the coagulating mixture. The method may further include, before flowing the coagulating mixture, generating the coagulating mixture by feeding a continuous flow of the first elastomer latex to a mixing zone of a coagulum reactor defining an elongate coagulum zone extending from the mixing zone to a discharge end and comprising the conduit, and feeding a continuous flow of a fluid comprising particulate filler under pressure to the mixing zone of the coagulum reactor to form the coagulating mixture.

The continuous flow of the fluid comprising particulate filler may have a velocity from about 30 m/s to about 250 m/s, the continuous flow of the first elastomer latex may have a velocity of at most about 10 m/s, and, under these conditions, a residence time of the coagulating mixture in the coagulum reactor before introducing the second elastomer latex may be from $1\times10^{-2}$ s to about $6\times10^{-2}$ s.

The conduit may include a first conduit portion having a first diameter, a second conduit portion having a second diameter greater than the first diameter, and a transition zone therebetween having a diameter that increases from the first diameter to the second diameter, and flowing may include flowing the coagulating mixture into the second conduit portion from the first conduit portion, and introducing may include introducing the second elastomer latex into the coagulating mixture in the transition region.

Flowing the coagulating mixture may include flowing the coagulating mixture through the transition region under conditions of turbulent flow. The amount of the second elastomer in the composite may be from about 0.5 wt % to about 50 wt %, for example, from about 16 wt % to about 38 wt %. The second elastomer may be a synthetic elastomer or natural rubber latex. The natural rubber latex may include field latex, latex concentrate, skim latex, or a combination of two or more of these. A component of the natural rubber latex may have been chemically or enzymatically modified.

The particulate filler may include a carbon black having a surface area of at least 95 $m^2/g$ as measured by STSA and a dibutyl phthalate adsorption of at least 80 mL/100 g, and the coagulated latex composite may include at least 65 phr of such a carbon black. The particulate filler may include a carbon black having a surface area of at least 68 $m^2/g$ as measured by STSA, for example, at least 75 $m^2/g$, and a dibutyl phthalate adsorption of at least 60 mL/100 g, and the coagulated latex composite may include at least 70 phr of such a carbon black. The particulate filler may include a carbon black having a dibutyl phthalate adsorption of at least 60 mL/100 g, and the carbon black may have a surface area and be present in the coagulated latex composite in an amount satisfying $L \geq -0.26*S+94$, where L is the amount of the carbon black in the coagulated latex composite in parts per hundred of rubber (phr) and S is the surface area in $m^2/g$ as measured by STSA.

In another embodiment, the invention is an elastomer composite formed by the method of flowing a coagulating mixture of a first elastomer latex and a particulate filler slurry along a conduit, and introducing a second elastomer latex into the flow of the coagulating mixture.

The method may further include, before flowing the coagulating mixture, generating the coagulating mixture by feeding a continuous flow of the first elastomer latex to a mixing zone of a coagulum reactor defining an elongate coagulum zone extending from the mixing zone to a discharge end and comprising the conduit, and feeding a continuous flow of a fluid comprising particulate filler under pressure to the mixing zone of the coagulum reactor to form the coagulating mixture.

The continuous flow of the fluid comprising particulate filler may have a velocity from about 30 m/s to about 250 m/s, the continuous flow of the first elastomer latex may have a velocity of at most about 10 m/s, and, under these, conditions, a residence time of the coagulating mixture in the coagulum reactor before introducing the second elastomer latex may be from $1 \times 10^{-2}$ s to about $6 \times 10^{-2}$ s.

The conduit may include a first conduit portion having a first diameter, a second conduit portion having a second diameter greater than the first diameter, and a transition zone therebetween having a diameter that increases from the first diameter to the second diameter, wherein flowing may include flowing the coagulating mixture into the second conduit portion from the first conduit portion, and introducing may include introducing the second elastomer latex into the coagulating mixture in the transition region. Flowing the coagulating mixture may include flowing the coagulating mixture through the transition region under conditions of turbulent flow.

The amount of the second elastomer in the composite is from about 0.5 wt % to about 50 wt %, for example from about 16 wt % to about 38 wt %. The second elastomer may be a synthetic elastomer or natural rubber latex. The natural rubber latex may include field latex, latex concentrate, skim latex, or a combination of two or more of these. A component of the natural rubber latex may have been chemically or enzymatically modified.

The particulate filler may include a carbon black having a surface area of at least 95 m²/g as measured by STSA and a dibutyl phthalate adsorption of at least 80 mL/100 g, and the elastomer composite may include at least 65 phr of such a carbon black. The particulate filler may include a carbon black having a surface area of at least 68 m²/g as measured by STSA, for example, at least 75 m²/g, and a dibutyl phthalate adsorption of at least 60 mL/100 g, and wherein the elastomer composite may include at least 70 phr of such a carbon black. The particulate filler may include a carbon black having a dibutyl phthalate adsorption of at least 60 mL/100 g, and such a carbon black may have a surface area and be present in the elastomer composite in an amount satisfying L≥−0.26*S+94, where L is the amount of the carbon black in the elastomer composite in parts per hundred of rubber (phr) and S is the surface area in m²/g as measured by STSA.

In another embodiment, the invention is a method for producing a coagulated latex composite. The method includes generating a flow of a coagulating mixture of a first elastomer latex comprising a first elastomer and a particulate filler slurry having a first degree of turbulence, causing the first degree of turbulence to change to a second degree of turbulence, and introducing a second elastomer latex into the coagulum at a location where the coagulum flow has the second degree of turbulence.

Generating a flow may include feeding a continuous flow of the first elastomer latex to a mixing zone of a coagulum reactor defining an elongate coagulum zone extending from the mixing zone to a discharge end and feeding a continuous flow of the particulate filler slurry under pressure to the mixing zone of the coagulum reactor to form the coagulating mixture. The continuous flow of the fluid comprising particulate filler may have a velocity from about 30 m/s to about 250 m/s, the continuous flow of the first elastomer latex may have a velocity of at most about 10 m/s, and, under these conditions, a residence time of the coagulating mixture in the coagulum reactor before introducing the second elastomer latex may be from $1 \times 10^{-2}$ s to about $6 \times 10^{-2}$.

The amount of the second elastomer in the composite may be from about 0.5 wt % to about 50 wt %, for example, from about 16 wt % to about 38 wt %. The second elastomer may be a synthetic elastomer or natural rubber latex. The natural rubber latex may include field latex, latex concentrate, skim latex, or a combination of two or more of these. A component of the natural rubber latex may have been chemically or enzymatically modified.

The particulate filler may include a carbon black having a surface area of at least 95 m²/g as measured by STSA and a dibutyl phthalate adsorption of at least 80 mL/100 g, and the coagulated latex composite may include at least 65 phr of such a carbon black. The particulate filler may include a carbon black having a surface area of at least 68 m²/g as measured by STSA, for example, at least 75 m²/g, and a dibutyl phthalate adsorption of at least 60 mL/100 g, and the coagulated latex composite may include at least 70 phr of such a carbon black. The particulate filler may include a carbon black having a dibutyl phthalate adsorption of at least 60 mL/100 g, and such a carbon black may have a surface area and be present in the coagulated latex composite in an amount satisfying L≥−0.26*S+94, where L is the amount of the carbon black in the coagulated latex composite in parts per hundred of rubber (phr) and S is the surface area in m²/g as measured by STSA.

In another embodiment, the invention is an apparatus comprising a coagulum reactor having a mixing portion and a generally tubular diffuser portion extending with progressively increasing cross-sectional area from an entry end to an open discharge end. The apparatus is further characterized by a delivery tube terminating in an injection orifice adapted and constructed to deliver a fluid to the diffuser portion at a portal disposed between the entry end and the open discharge end.

The diffuser portion may include a first diffuser section having a first diameter, a second diffuser section having a second diameter, the second diameter being larger than the first diameter, and a transition region between said first and second sections and having a diameter that increases from the first diameter to the second diameter, wherein the portal is disposed in the transition region.

The apparatus may further include at least one additional diffuser section disposed downstream of the second diffuser section and having a diameter larger than the second diameter. The apparatus may further include at least one additional diffuser section disposed between the mixing portion and the first diffuser portion and having a diameter smaller than the first diameter.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

DETAILED DESCRIPTION OF THE INVENTION

While it is often desirable to produce elastomer composite with higher loadings of fillers such as carbon black in a continuous wet masterbatch process, coagulated rubbers containing higher loadings of filler are sometimes difficult to pass through downstream processing equipment. We have unexpectedly discovered that adding additional elastomer latex into a coagulating mixture having a high weight fraction of filler results in the formation of a continuous masterbatch crumb, termed a "coherent coagulum." Because the coherent coagulum is a cohesive mass, it does not crumble when handled and can be easily dewatered using standard equipment such as the dewatering extruder available from the French Oil Machinery Company (Piqua, Ohio, USA). This enables the continuous production of elastomer composites having high loadings of filler and which can be used to produce vulcanized rubbers having superior properties. In contrast, masterbatch crumb that is not cohesive can backflow in downstream equipment, causing it to clog or to become ineffective at de-watering.

In one embodiment, a method of producing a coagulated latex composite includes flowing a coagulating mixture of a first elastomer latex and a particulate filler slurry along a conduit and introducing a second elastomer latex into the flow of the coagulating mixture.

Figure 1:
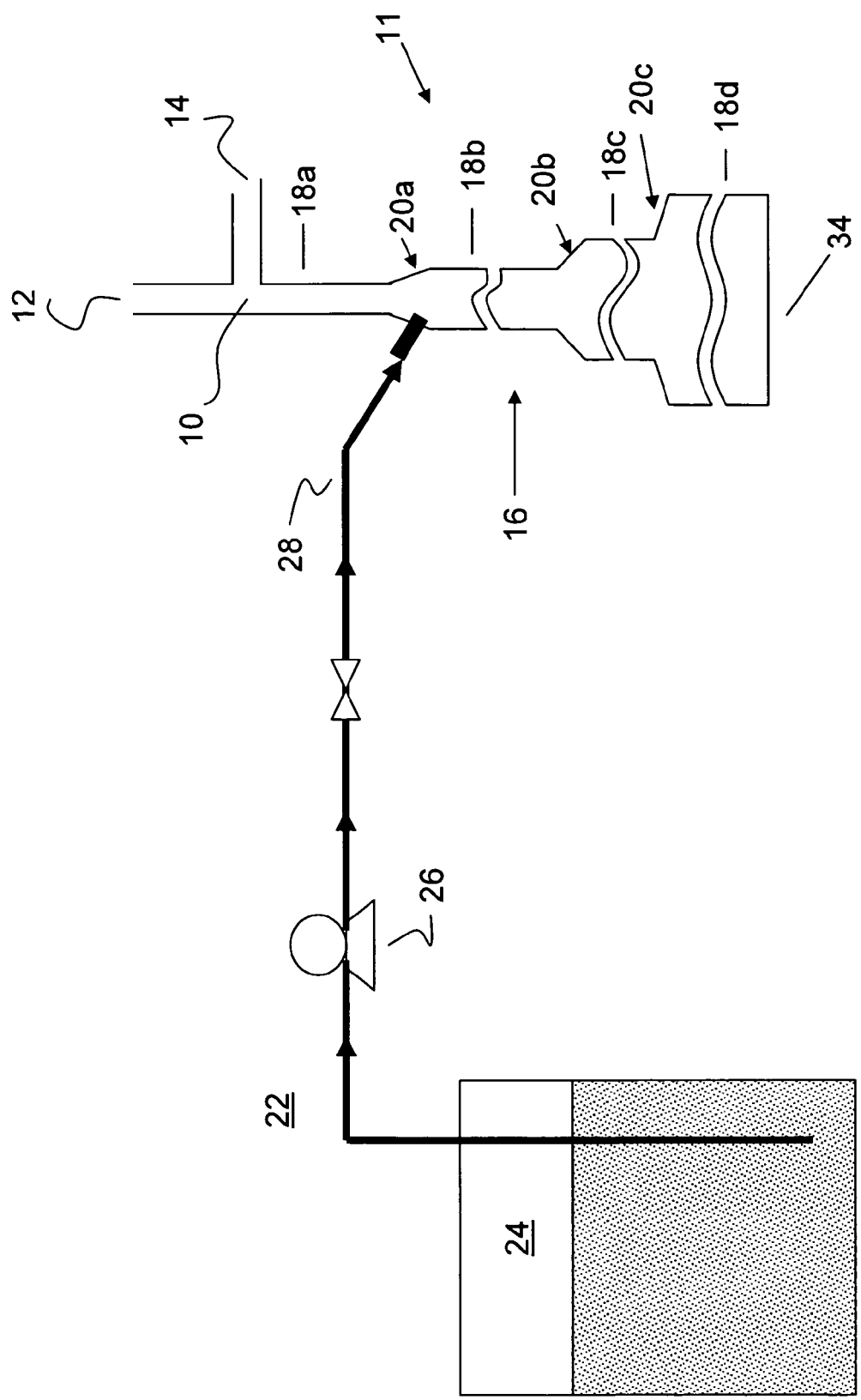
FIG. 1 is a schematic diagram of an apparatus for production of latex coagulum composite according to an exemplary embodiment of the invention.

As shown in FIG. 1, a particulate filler slurry is fed into a mixing portion 10 of a coagulum reactor 11 via a filler feed line 12. An elastomer latex is fed into mixing portion 10 via latex feed line 14. The latex begins to coagulate in the mixing portion 10, and the coagulating mixture, including elastomer and particulate filler, proceeds through a diffuser portion 16 of coagulum reactor 11. As shown in FIG. 1, the diffuser portion 16 has a series of sections 18a-18d, each one having progressively higher diameter than the previous section 18. Preferably, transition regions 20a-c provide a gradual increase in diameter from one section 18 to the next. One of skill in the art will recognize that the diffuser portion may have greater or fewer sections 18 than shown in the figure.

The second elastomer latex, is introduced via injection system 22. Injection system 22 includes a holding tank 24 and a pump 26 that directs the second elastomer latex into the coagulum reactor 11 via an injection line 28. Preferably, pump 26 is operated to generate sufficient pressure to prevent back flow of the coagulating mixture into injection line 28. Other suitable apparatus, e.g., different type pumping or compression equipment, may be employed to introduce the second elastomer latex into the coagulating mixture. As shown in FIG. 1, the second elastomer latex is injected into the coagulating mixture in transition region 20a. One of skill in the art will recognize that the optimal injection location for the second elastomer latex may vary depending on the composition of the coagulating mixture and the second elastomer latex.

Elastomer latex is an emulsion of rubber particles in water. The rubber in the particles is a highly viscous fluid of rubber molecules, surrounded by a shell of naturally occurring substances that stabilize the rubber particles against aggregation and coalescence. Destabilization of the latex causes it to coagulate, i.e, the rubber particles aggregate and coalesce with one another. In preferred embodiments, the velocity of the particulate filler slurry is significantly higher than that of the first elastomer latex. The resulting high shear destabilizes the latex. Without being bound by any particular theory, it is believed that rapid mixing of the particulate slurry with the latex results in decoration of the rubber particle surface by the particulates, which also destabilizes the latex. Filler particles colliding with each other also form agglomerates that can collide with and destabilize latex particles. The combination of these factors causes the elastomer latex to destabilize; rubber particles aggregate by forming rubber-rubber contacts or by bridging through filler particles on their surfaces to form rubber-filler composite aggregates.

Without being bound by any particular theory, it is believed that in the presence of excess particulate filler, the rubber particles or small aggregates of rubber particles become completely decorated with the filler, with little or no free rubber surface area to form rubber-rubber contacts with other rubber particles. This limits the extent to which the rubber-filler composite aggregates can further aggregate to form a continuous network. Instead, rather than forming a coherent coagulum, the masterbatch crumb takes the form of discontinuous composite domains dispersed in an aqueous phase. The second elastomer latex introduces fresh latex particles that, because they are not yet decorated with filler particles, can bind together the discrete rubber-filler composite aggregates to form a continuous rubber-particle composite in the form of a coherent coagulum.

For apparatus similar to that shown in FIG. 1, factors influencing the coherence of the coagulum include the amount of particulate filler injected into the mixing block (e.g., the target filler loading), the filler morphology (e.g., surface area, structure), the residence time of the mixture of the first elastomer latex and the particulate filler slurry before introduction of the second elastomer latex, and the appropriate mixing of the second elastomer latex into the mixture.

According to the theory above, there is a limit beyond which the introduction of additional latex will not enable the discrete rubber-filler composite aggregates to form a coherent coagulum. That is, if there is excess filler in the mixture after the rubber particles have been completely decorated, the rubber particles in the second elastomer latex stream will become decorated with the excess filler rather than binding the existing rubber-filler aggregates together. Thus, while the use of the second elastomer latex stream can increase the filler loading level obtainable while still producing coherent coagulum, the potential increase is not infinite. The concentration of the filler in the slurry, the feed rate and velocity of the filler slurry into the mixing zone, and the proportion of the rubber introduced with second elastomer latex with respect to the total rubber in the final composite may all be optimized to maximize the effectiveness of the second elastomer latex.

In certain embodiments, the secondary latex improves the achievable filler loading (e.g., elastomer composite produced with this amount of filler has the morphology of a coherent coagulum) by at least 0.5 phr with respect to elastomer composite produced in a continuous wet masterbatch process without secondary latex, for example, from 0.5 phr to about 15 phr, from about 1 phr to about 14 phr, from about 2 phr to about 13 phr, from about 3 phr to about 12 phr, from about 4 phr to about 11 phr, from about 5 phr to about 10 phr, from about 6 phr to about 9 phr, from about 7 phr to about 8 phr, from about 1 phr to about 7 phr, from about 1 phr to about 6 phr, or from about 1 phr to about 5 phr.

In certain preferred embodiments, use of secondary latex enables use of a continuous wet masterbatch process to produce elastomer composite having at least 65 phr, for example, at least 70 phr or from 65 to 75 phr, of a carbon black having a surface area of at least 95 m$^2$/g, as measured by the statistical thickness method (STSA), expressed as square meters per gram of carbon black, according to the procedure set forth in ASTM D6556 (STSA) and a structure, measured by dibutyl phthalate (DBP) adsorption (ASTM D6854), of at least 80 mL/100 g, for example, from 80 mL/100 g to 160 mL/100 g. Alternatively or in addition, the use of secondary latex may enable use of a continuous process to produce elastomer composite having at least 70 phr, for example, at least 75 phr or from 70 phr to 80 phr, of carbon black having a surface area of at least 68 m$^2$/g as measured by STSA, for example, at least 75 m$^2$/g, and structure, as measured by DBP adsorption, at least 60 mL/100 g, for example, from 60 mL/100 g to 160 mL/100 g. Alternatively or in addition, use of secondary latex enables use of a continuous wet mastermatch process to produce elastomer composite containing carbon black having a DBP adsorption of at least 60 mL/100 mg, for example, at least 80 mL/100 mg, at least 100 mL/100 mg or from 60 mL/100 mg to 160 mL/100 mg, and having a surface area and being present in an amount that satisfies L≥−0.26*S+94, for example, L≥−0.26*S+97, or L≥−0.26*S+100, or L≥−0.26*S+104, or −0.26*S+94 L≤−0.26*S+110, where L is the amount of carbon black in the elastomer composite in parts per hundred of rubber (phr) and S is the surface area in m$^2$/g measured as STSA (ASTM D6556), where S is optionally at least 65 m$^2$/g, at least 95 m$^2$/g, at least 110 m$^2$/g, or from 65 m$^2$/g to 400 m$^2$/g, for example from 65 m$^2$/g to 220 m$^2$/g, from 95 m$^2$/g to 200 m$^2$/g, or from 110 m$^2$/g to 180 m$^2$/g.

Furthermore, according to the above theory, the effectiveness of the second elastomer latex will be maximized if it is not introduced until substantially all the filler has been adsorbed onto the rubber particles in the first elastomer latex. Otherwise, the secondary latex particles become decorated with the filler rather than binding the existing rubber-filler aggregates. The time required for the filler slurry and the elastomer latex to mix together and allow the filler particles to adsorb onto the rubber particles depends in part on how energetically the two fluids are mixed together. For apparatus similar to that depicted in FIG. 1, when the first elastomer latex is fed into mixing portion 10 at a velocity of less than about 10 m/s, for example, from about 1 to about 10 m/s, from about 1.5 to about 8 m/s, from about 2 to about 6 m/s, from about 3 to about 5 m/s, or about 4 m/s to about 7 m/s, and the particulate filler slurry is fed into mixing portion 10 at a velocity of at least 30 m/s, for example, about 30 to about 250 m/s or about 60 to about 150 m/s, a preferred residence time before injection of the secondary latex, i.e., the time required for the mixture of the particulate slurry to travel from the mixing portion 10 to the location where the secondary latex is injected, is from about 1×10$^{-2}$ s to about 6×10$^{-2}$ s, for example, from 1.5×10$^{-2}$ s to about 5.5×10$^{-2}$ s, from about 1.85×10$^{-2}$ s to about 5×10$^{-2}$ s, from about 2×10$^{-2}$ s to about 4×10$^{-2}$ s, from about 2.25×10$^{-2}$ s to about 3.5×10$^{-2}$ s, from about 2.1×10$^{-2}$ s to about 3×10$^{-2}$ s, or from about 2.25×10$^{-2}$ s to about 2.9×10$^{-2}$ s. We have also found that excessive residence time before the introduction of the second elastomer latex reduces the maximum filler loading before the resulting coagulum is discontinuous rather than coherent. Without being bound by any particular theory, this may result from incomplete mixing of the second elastomer latex into the coagulating mixture of the first elastomer latex and particulate filler slurry, reducing the effectiveness of the secondary latex. We have found that if the second elastomer latex is injected too far downstream in the diffuser, it does not thoroughly blend into the flow of the coagulating mixture. The residence time may be varied to optimize various operating conditions; suitable ranges may vary with the production rate.

The physical configuration of the injection system 22 also may be adjusted to optimize the mixing of the second elastomer latex into the mixture. The initial flow of the coagulating mixture through the upstream portions of the diffuser is relatively turbulent. This turbulence gradually subsides as the coagulating mixture proceeds downstream, and the flow of the coagulum from the outlet 34 of the diffuser is roughly laminar. Without being bound by any particular theory, it is believed that the turbulence associated with the expansion of the flow cross-section between the first and second sections 18a and 18b at transition 20a facilitates mixing of the second elastomer latex injected at that point into the coagulating rubber-filler composite. Other factors influencing mixing and turbulence include the distance from the point of slurry injection, the injection velocity, the difference in cross-sectional area between the first and second diffuser sections, the injection velocity of the secondary latex stream, and the angle of injection of the secondary latex stream.

For example, the second section of the diffuser 18b may have a cross-sectional area from about 1.2-3.5 times the cross-sectional area of the first section of the diffuser 18a, for example, from about 1.2 to about 1.4 times, from about 1.4 to about 1.6 times, from about 1.5 to about 1.7 times, from about 1.7 to 1.9 times, from about 1.9 to about 2.1 times, from about 2.1 to about 2.3 times, from about 2.3 to about 2.5 times, from about 2.5 to about 2.7 times, from about 2.7 to about 2.9 times, from about 2.9 to about 3.1 times, from about 3.1 times to about 3.3 times, or from about 3.3 to about 3.5 times greater. In specific examples, the ratio of the cross-sectional areas of sections 18b and 18a may be about 2, about 2.5, or about 3. The lengths of the various sections of the diffuser 18a-18d and the dimensions of the downstream sections 18c and 18d may be as described in U.S. Pat. No. 6,048,923, the contents of which are incorporated herein by reference. In certain embodiments, the length of first section 18a may be from about 2 inches (5.08 cm) to about 9 inches (35.8 cm), for example, from about 2 inches (5.08 cm) to about 3 inches (7.62 cm), from about 3 inches (7.62 cm) to about 4 inches (10.2 cm), from about 4 inches (10.2 cm) to about 5 inches (12.7 cm), from about 5 inches (12.7 cm) to about 6 inches (15.2 cm), from about 6 inches (15.2 cm) to about 7 inches (17.8 cm), from about 7 inches (17.8 cm) to about 8 inches (20.3 cm), or from about 8 inches (20.3 cm) to about 9 inches (35.8 cm). The optimal length may vary and generally increases with the production rate.

Figure 2:
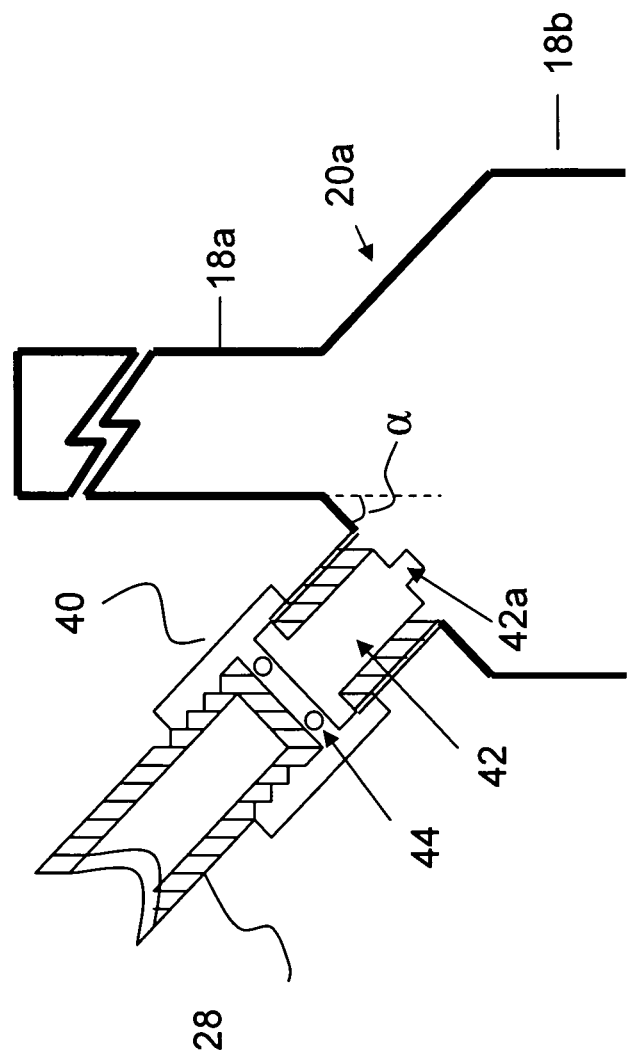
FIG. 2 is a schematic diagram of an apparatus for injection of a second elastomer latex into a coagulum according to an exemplary embodiment of the invention.

An exemplary approach for introducing the second elastomer latex to the coagulating mixture is illustrated in FIG. 2. As shown in FIG. 2, the second elastomer latex is introduced into the coagulating mixture via a nipple 40 that connects injection line 28 to injector 42 having injection orifice 42a. An o-ring 44 may be used to improve the seal within nipple 40. While injector 42 is shown injecting the second elastomer latex into the coagulating mixture at a 45 degree angle to an axis of the coagulum reactor, one of skill in the art will recognize that the angle and injector size may be varied depending on the composition of the coagulating mixture and of the second elastomer latex. For example, when injector 42 is at a right angle to the wall of transition area 20a, the angle α of the transition area 20a may be from 0.5° to 25°, for example, from 0.5° to 1°, from 1° to 2°, from 2° to 3°, from 3° to 4°, from 4° to 5°, from 5° to 6°, from 6° to 7°, from 7° to 8°, from 8° to 9°, from 9° to 10°, from 10° to 11°, from 11° to 12°, from 12° to 13°, from 13° to 14°, from 14° to 15°, from 15° to 16°, from 16° to 17°, from 17° to 18°, from 18° to 19°, from 19° to 20°, from 20° to 21°, from 21° to 22°, from 22° to 23°, from 23° to 24°, or from 24° to 25°. In another example, the interior diameter of injection orifice 42a may vary from 0.045 to 0.25 inches or even larger depending on the size of the diffuser portion 16. For example, the interior diameter of injection orifice 42a may be from 0.045 inches (0.11 cm) to 0.055 inches (0.14 cm), from 0.055 inches (0.14 cm) to 0.06 inches (0.15 cm), from 0.06 inches (0.15 cm) to 0.065 inches (0.17 cm), from 0.065 inches (0.17 cm) to 0.07 inches (0.18 cm), from 0.07 inches (0.18 cm) to 0.075 inches (0.19 cm), from 0.075 inches (0.19 cm) to 0.08 inches (0.20 cm), from 0.08 inches (0.20 cm) to 0.09 inches (0.23 cm), from 0.09 inches (0.23 cm) to 0.1 inches (0.25 cm), from 0.1 inches (0.25 cm) to 0.125 inches (0.32 cm), from 0.125 inches (0.32 cm) to 0.15 inches (0.38 cm), from 0.15 inches (0.38 cm) to 0.175 inches (0.44 cm), from 0.175 inches (0.44 cm) to 0.2 inches (0.51 cm), from 0.2 inches (0.51 cm) to 0.225 inches (0.57 cm), or from 0.225 inches (0.57 cm) to 0.25 inches (0.64 cm). One of skill in the art will recognize that the size of the injection orifice may be varied depending, e.g., on the desired flow rate and pressure. For example, the injection pressure may be from 2-8 bar (0.2-0.8 MPa), from 3-8 bar (0.3-0.8 MPa), 4-7 bar (0.4-0.7 MPa), or 5-6 bar (0.5-0.6 MPa). Other suitable designs may also be employed. For example, the injection orifice may be gradually tapered inwardly with respect to injector 42 or may have the same diameter as injector 42.

The second elastomer latex may have the same composition as that used to prepare the coagulating mixture, or it may differ in some way. For example, the second elastomer latex may be an elastomer latex from a different source or with a different concentration of rubber and fluid. Alternatively or in addition, it may be subjected to different chemical modifications (including no modification) than the first elastomer latex.

In certain embodiments, at least one of and preferably both the first elastomer latex (i.e., the elastomer latex in the coagulating mixture) and the second elastomer latex are prepared from a natural rubber latex. Exemplary natural rubber latices include but are not limited to field latex, latex concentrate (produced, for example, by evaporation, centrifugation or creaming), skim latex (a by-product of the centrifugation of natural rubber latex) and blends of any two or three of these in any proportion. The latex should be appropriate for the wet masterbatch process selected and the intended purpose or application of the final rubber product. The latex is provided typically in an aqueous carrier liquid. Selection of a suitable latex or blend of latices will be well within the ability of those skilled in the art given the benefit of the present disclosure and the knowledge of selection criteria generally well recognized in the industry.

The natural rubber latex may also be chemically modified in some manner. For example, it may be treated to chemically or enzymatically modify or reduce various non-rubber components, or the rubber molecules themselves may be modified with various monomers or other chemical groups such as chlorine. Exemplary methods of chemically modifying natural rubber latex are disclosed in European Patent Publications Nos. 1489102, 1816144, and 1834980, Japanese Patent Publications Nos. 2006152211, 2006152212, 2006169483, 2006183036, 2006213878, 2006213879, 2007154089, and 2007154095, U.S. Pat. Nos. 6,841,606 and 7,312,271, and U.S. Patent Publication No. 2005-0148723. Other methods known to those of skill in the art may be employed as well.

In an alternative embodiment, at least one of the first elastomer latex (i.e., the elastomer latex in the coagulating mixture) and the second elastomer latex is prepared using synthetic elastomer latex. The elastomer of the synthetic elastomer latex may have a glass transition temperature (Tg) as measured by differential scanning calorimetry ranging from about −120° C. to about 20° C. The synthetic latex may be a latex of rubber or "diene" elastomer. The term "diene" elastomer or rubber should be understood as meaning, in a known way, an (one or more are understood) elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Synthetic diene elastomer of the first elastomer latex or of the second elastomer latex in accordance with the invention is preferably chosen from the group of the highly unsaturated diene elastomers consisting of polybutadienes (abbreviated to "BR"), synthetic polyisoprenes (IR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or of polyether groups (such as described, for example, in U.S. Pat. No. 6,503,973). Mention may also be made, as other examples of such functionalized elastomers, of elastomers (such as SBR, BR, NR or IR) of the epoxidized type.

The following are preferably suitable: polybutadienes, in particular those having a content of 1,2-units from 4% to 80% or those having a content of cis-1,4-units of greater than 80%, polyisoprenes, butadiene/styrene copolymers in particular those having a styrene content from 5% to 70% by weight, more particularly from 10% to 50%, for example, from 20% to 40% by weight or from about 23% to about 28% by weight, a content of 1,2-bonds of the butadiene part from 4% to 65% and a content of trans-1,4-bonds from 20% to 80%, butadiene/isoprene copolymers, in particular those having an isoprene content from 5% to 90% by weight and a glass transition temperature ("Tg"—measured according to ASTM D 3418-82) of −40° C. to −80° C., or isoprene/styrene copolymers, in particular those having a styrene content from 5% to 50% by weight and a Tg from −25° C. to −50° C.

In the case of butadiene/styrene/isoprene copolymers, those having a styrene content of from 5% to 50% by weight and more particularly from 10% to 40%, an isoprene content from 15% to 60% by weight and more particularly from 20% to 50%, a butadiene content from 5% to 50% by weight and more particularly from 20% to 40%, a content of 1,2-units of the butadiene part from 4% to 85%, a content of trans-1,4-units of the butadiene part from 6% to 80%, a content of 1,2-plus 3,4-units of the isoprene part from 5% to 70% and a content of trans-1,4-units of the isoprene part from 10% to 50%, and more generally any butadiene/styrene/isoprene copolymer having a Tg from −20° C. to −70° C., are suitable in particular.

Exemplary synthetic elastomers include, but are not limited to, rubbers and polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, and propylene and the like. Examples include, but are not limited to, styrene-butadiene rubber (SBR), polybutadiene, polyisoprene, poly(styrene-co-butadiene), polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alphamethylene carboxylic acids and the esters and amides thereof such as acrylic acid and dialkylacrylic acid amide. Blends and/or oil extended derivatives of any of the elastomers discussed herein may also be used. Also suitable for use herein are copolymers of ethylene and other high alpha olefins such as propylene, butene-1 and pentene-1.

In some embodiments, it may be desirable to inject a coagulant, for example, a salt or acid solution, along with the elastomer latex stream, to promote coagulation of the elastomer.

The particulate filler fluid may be a carbon black slurry or any other suitable filler in a suitable carrier fluid. Selection of the carrier fluid will depend largely upon the choice of particulate filler and upon system parameters. Both aqueous and non-aqueous liquids may be used, with water being preferred in many embodiments in view of its cost, availability and suitability of use in the production of carbon black and certain other filler slurries. Small amounts of water-miscible organic solvents may also be included in aqueous carrier fluids.

Selection of the particulate filler or mixture of particulate fillers will depend largely upon the intended use of the elastomer masterbatch product. As used here, particulate filler can include any material which is appropriate for use in the masterbatch process used to produce the masterbatch crumb. Suitable particulate fillers include, for example, conductive fillers, reinforcing fillers, fillers comprising short fibers (typically having an L/D aspect ratio less than 40), flakes, etc. In addition to carbon black and silica-type fillers, discussed in more detail below, fillers can be formed of clay, glass, polymer, such as aramid fiber, etc. It is expected that any filler suitable for use in elastomer compositions may be incorporated into elastomer composites according to various embodiments of the invention. Of course, blends of the various particulate fillers discussed herein may also be used.

When a carbon black filler is used, selection of the carbon black will depend largely upon the intended use of the elastomer masterbatch product. Optionally, the carbon black filler can include also any material which can be slurried and combined with a latex in the particular wet masterbatch process selected by the skilled artisan. Exemplary particulate fillers include but are not limited to carbon black, fumed silica, precipitated silica, coated carbon black, chemically functionalized carbon blacks, such as those having attached organic groups, and silicon-treated carbon black, either alone or in combination with each other. Exemplary carbon blacks include ASTM N100 series—N900 series carbon blacks, for example N100 series carbon blacks, N200 series carbon blacks, N300 series carbon blacks, N700 series carbon blacks, N800 series carbon blacks, or N900 series carbon blacks. Elastomer composites containing ASTM N100, N200, and/or N300 series blacks and/or carbon blacks having similiarly high or higher surface areas, e.g. a surface area measured by the statistical thickness method (STSA), expressed as square meters per gram of carbon black, according to the procedure set forth in ASTM D6556 (STSA) of 68 $m^2/g$ or greater, for example, 75 $m^2/g$ or greater or 95 $m^2/g$ or greater, for example, from 68 $m^2/g$ to 400 $m^2/g$ may especially benefit from the teachings herein. In certain preferred embodiments, such carbon blacks have a structure, as measured by dibutyl phthalate adsorption, of at least 60 mL/100 g, for example, at least 80 mL/100 g, or from 60 mL/100 g to 160 mL/100 g. Carbon blacks sold under the Regal®, Black Pearls®, Spheron®, Sterling®, and Vulcan® trademarks available from Cabot Corporation, the Raven®, Statex®, Furnex®, and Neotex® trademarks and the CD and HV lines available from Columbian Chemicals, and the Corax®, Durax®, Ecorax®, and Purex® trademarks and the CK line available from Evonik (Degussa) Industries, and other fillers suitable for use in rubber or tire applications, may also be exploited for use with various embodiments. Suitable chemically functionalized carbon blacks include those disclosed in International Application No. PCT/US95/16194 (WO 96/18688), the disclosure of which is hereby incorporated by reference.

Both silicon-coated and silicon-treated carbon blacks may be employed in various embodiments. In silicon-treated carbon black, a silicon containing species such as an oxide or carbide of silicon is distributed through at least a portion of the carbon black aggregate as an intrinsic part of the carbon black. Conventional carbon blacks exist in the form of aggregates, with each aggregate consisting of a single phase, which is carbon. This phase may exist in the form of a graphitic crystallite and/or amorphous carbon, and is usually a mixture of the two forms. Carbon black aggregates may be modified by depositing silicon-containing species, such as silica, on at least a portion of the surface of the carbon black aggregates. The result may be described as silicon-coated carbon blacks.

The materials described herein as silicon-treated carbon blacks are not carbon black aggregates which have been coated or otherwise modified, but actually represent a different kind of aggregate having two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. A variety of silicon-treated blacks are available from Cabot Corporation under the Ecoblack™ name. It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in, e.g., U.S. Pat. No. 6,929,783.

One or more additives also may be pre-mixed, if suitable, with the particulate slurry or with the elastomer latex fluid or may be combined with the mixture of these during coagulation. Additives also can be mixed into the coagulating mixture. Numerous additives are well known to those skilled in the art and include, for example, antioxidants, antiozonants, plasticizers, processing aids (e.g., liquid polymers, oils and the like), resins, flame-retardants, extender oils, lubricants, coupling agents, and a mixture of any of them. Exemplary additives include but are not limited to zinc oxide and stearic acid. The general use and selection of such additives is well known to those skilled in the art. It should be understood that the elastomer composites disclosed here include vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

The fraction of the second elastomer with respect to the total rubber in the composite (i.e., the amount of rubber contributed to the coagulum by the second elastomer latex with respect to the total amount of rubber in the coagulum) may be adjusted, e.g., by adjusting the relative flow rates of the two elastomer latices. Other variables that may be manipulated to optimize the filler loading include the absolute flow rate of the first elastomer latex and filler slurry (e.g., the production rate), the relative flow rate of the first elastomer latex and filler slurry (e.g., the filler loading), the location where the second elastomer latex is injected, and the size of injector 42. The fraction of the second elastomer with respect to total rubber may be from about 0.5 wt % to about 50 wt %, for example from about 1 wt % to about 45 wt %, from about 5 wt % to about 40 wt %, from about 10 wt % to about 15 wt %, from about 15 wt % to about 20 wt %, from about 20 wt % to about 25 wt %, from about 25 wt % to about 30 wt %, from about 30 wt % to about 35 wt %, from about 35 wt % to about 40 wt %, or from about 40 wt % to about 45 wt %. In certain embodiments, the fraction may be from about 16 wt % to about 38 wt %. The proportion of the second elastomer that may be used depends in part on the desired composition but may be physically limited depending on the amount of the first elastomer latex that should be injected into mixing portion 10 to generate the initial coagulating mixture.

The amount of filler in the elastomer composite may be any amount of filler that is used to make elastomer composites. For example, rubbers may be produced with at least about 10 phr (parts per hundred of rubber by weight), at least about 20 phr, at least about 30 phr, at least about 40 phr, at least about 50 phr, at least about 55 phr, at least about 60 phr, at least about 65 phr at least about 70 phr, at least about 75 phr, at least about 80 phr, at least about 85 phr, at least about 90 phr, at least about 95 phr, or at least about 100 phr of filler. However, the teachings herein will provide greater advantages with respect to other wet masterbatch methods at higher loadings of filler, for example, from about 40 phr to about 100 phr, from about 50 phr to about 95 phr, from about 55 phr to about 90 phr, from about 60 phr to about 85 phr, from about 60 phr to about 80 phr, from about 65 phr to about 75 phr, or from about 45 phr to about 70 phr. One of skill in the art will recognize that what constitutes a "high loading" will depend on the morphology of the filler, including, e.g., its surface area and structure.

In some embodiments, the use of secondary latex increases the maximum filler loading (e.g., the maximum loading of filler while producing a coherent coagulum), by about 3% to about 30%, for example, from about 3% to about 5%, from about 5% to about 10%, from about 10% to about 15%, from about 15% to about 20%, from about 20% to about 25%, or from about 25% to about 30%, with respect to the maximum loading of filler while producing a coherent coagulum without the use of secondary latex.

The masterbatch crumb produced from the first elastomer latex, the particulate filler slurry, and the second elastomer latex emerges from the discharge end of the coagulum reactor as a substantially constant flow of coagulum concurrently with the on-going feeding of the elastomer latices and particulate filler slurry streams into the coagulum reactor 11. Preferably, the masterbatch crumb is in the form of a "coherent coagulum," a continuous composite in which the carbon black is dispersed within the coagulated latex, rather than a discontinuous flow of composite in which discrete globules of coagulated latex are separated by an aqueous carrier. Nonetheless, discontinuous coagulum may be processed by manual or batch dewatering methods, followed by thermal drying. Preferably, continuous coagulum is created and then formed into a desirable extrudate, for example, having about 70-85% water content. After formulation, the resulting masterbatch crumb may be passed to suitable drying and compounding apparatus.

In one embodiment, the masterbatch crumb is passed from coagulum reactor 11 to a de-watering extruder via a simple gravity drop or other suitable apparatus known to those of skill in the art. The dewatering extruder may bring the elastomer composite from, e.g., approximately 70-85% water content, to a desired water content, e.g., approximately 1% to 20% water content. The optimal water content may vary with the elastomer employed, the type of filler, and the desired downstream processing procedure. Suitable de-watering extruders are well known and commercially available from, for example, the French Oil Mill Machinery Co. (Piqua, Ohio, USA).

After de-watering, the resulting dewatered coagulum may be dried. In certain embodiments, the dewatered coagulum is simply thermally dried. Preferably, the dewatered coagulum emerging from the de-watering extruder is mechanically masticated while drying. For example, the dewatered coagulum may be mechanically worked with one or more of a continuous mixer, an internal mixer, a twin screw extruder, a single screw extruder, or a roll mill. Suitable masticating devices are well known and commercially available, including for example, a Unimix Continuous Mixer and MVX (Mixing, Venting, eXtruding) Machine from Farrel Corporation of Ansonia, Conn., a long continuous mixer from Pomini, Inc., a Pomini Continuous Mixer, twin rotor corotating intermeshing extruders, twin rotor counterrotating non-intermeshing extruders, Banbury mixers, Brabender mixers, intermeshing-type internal mixers, kneading-type internal mixers, continuous compounding extruders, the biaxial milling extruder produced by Kobe Steel, Ltd., and a Kobe Continuous Mixer. Alternative masticating apparatus suitable for use with various embodiments of the invention will be familiar to those of skill in the art. Exemplary methods for mechanically masticating dewatered composite are disclosed in U.S. Pat. Nos. 6,929,783 and 6,841,606, and PCT Application Publication No. WO2009/099623, the contents of all of which are incorporated herein by reference.

In certain embodiments, additives can be combined with the dewatered coagulum in the mechanical mixer. Specifically, additives such as filler (which may be the same as, or different from, the filler used in the coagulum reactor; exemplary fillers include silica and zinc oxide, with zinc oxide also acting as a curing agent), other elastomers, other or additional masterbatch, antioxidants, antiozonants, plasticizers, processing aids (e.g., stearic acid, which can also be used as a curing agent, liquid polymers, oils, waxes, and the like), resins, flame-retardants, extender oils, lubricants, and a mixture of any of them, can be added in the mechanical mixer. In certain other embodiments, additional elastomers can be combined with the dewatered coagulum to produce elastomer blends. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, and propylene and the like. Methods of producing masterbatch blends are disclosed in our commonly owned U.S. Pat. Nos. 7,105,595, 6,365,663, and 6,075,084. Alternatively or in addition, traditional compounding techniques may be used to combine vulcanization agents and other additives known in the art with the dewatered coagulum or, where a masticating apparatus is used to dry the material, the resulting masticated masterbatch, depending on the desired use.

In certain embodiments, elastomer composite may be used in or produced for use in various parts of a tire, for example, tires, tire treads, tire sidewalls, wire-skim for tires, and cushion gum for retread tires. Additional, non-tire, applications for these elastomer composites include but are not limited to rubber components of engine mounts, rank tracks, mining belts, rubber components of hydro-mounts, bridge bearings, seismic isolators, tracks and track pads for track-propelled equipment such as bulldozers, etc., mining equipment such as screens, mining equipment linings, conveyor belts, chute liners, slurry pump liners, mud pump components such as impellers, valve seats, valve bodies, piston hubs, piston rods, and plungers, impellers for various applications such as mixing slurries and slurry pump impellers, grinding mill liners, cyclones and hydrocyclones, and expansion joints, marine equipment such as linings for pumps (e.g., outboard motor pumps, dredge pumps), hoses (e.g., dredging hoses and outboard motor hoses), and other marine equipment, shaft seals for marine, oil, aerospace, and other applications, propeller shafts, linings for piping to convey, e.g., oil sands and/or tar sands, and other applications where abrasion resistance is desired.

The present invention will be further clarified by the following examples which are intended to be only exemplary in nature

EXAMPLES

Example 1

Carbon Black Slurry Preparation

Dry carbon black (grade indicated in Table 1, below, obtained from Cabot Corporation) was mixed with water and ground to form a slurry having a concentration of about 10-15 wt %. The slurry was fed to a homogenizer at an operating pressure of around 3000 psig to produce a finely dispersed carbon black slurry, and the slurry was introduced as a jet into the mixing zone. The carbon black flow rate was adjusted to about 690-960 kg/hr (wet basis) to modify final carbon black loading levels in composites produced with field latex and to about 1145 kg/hr (wet basis) when latex concentrate was employed.

TABLE 1

| Carbon Black Grade | STSA* ($m^2/g$) | DBP adsorption** (mL/100 g) |
|---|---|---|
| N234 | 114 | 125 |
| N134 | 131 | 127 |
| Experimental Black 1 | 154 | 123 |

*ASTM D6556
**ASTM D2414

Primary Latex Delivery

Natural rubber latex materials described in Table 2 (field latex unless indicated otherwise in Table 2) were pumped to the mixing zone of the coagulum reactor. The latex flow rate was adjusted between about 320-790 kg/h (wet basis) in order to modify final carbon black loading levels.

Carbon Black and Latex Mixing

The carbon black slurry and latex were mixed by entraining the latex into the carbon black slurry in a mixing portion (e.g., mixing portion 10) of a coagulum reactor similar to that shown in FIG. 1. During the entrainment process, the carbon black was intimately mixed into the latex and the mixture coagulated.

Secondary Latex Delivery

Natural rubber latex materials described in Table 2 were pumped into various locations downstream of the mixing portion of the coagulum reactor at a pressure of 3-8 bar starting at a rate of about 80 kg/hour (wet basis). The latex was injected at a right angle to the wall of the coagulum reactor to which the injection line (e.g., element 28) is affixed. The pumping rate was gradually increased to at most 300 kg/hr (wet basis) until the coagulum emerging from the diffuser exhibited the desired morphology. Downstream of the mixing portion, a diffuser portion had a series of sections, each one having progressively higher diameter than the previous section, with a beveled transition portion in between sections. The first section of the diffuser (e.g., 18a in FIG. 1) was 4 inches (10.2 cm) long; the second section (e.g., 18b in FIG. 1) was 3 inches (7.6 cm) long. The angle of the transition region (e.g. a in FIG. 2) was 7 degrees. The ratio of the diameters of the second section (e.g., 18b in FIG. 1) to the first section (e.g., 18a in FIG. 1), was about 1.7. The location into which the secondary latex was pumped and the fraction of the rubber from the secondary latex in the final product (i.e., the ratio of rubber from the secondary latex with respect to the total rubber from the primary and secondary latex streams) are indicated in Table 2 below. Data shown in bold face reflect the maximum loading achieved for a particular location of secondary latex injection, listed in Table 3 below.

TABLE 2A

| | CB grade | | | | | | | |
|---|---|---|---|---|---|---|---|---|
| | N234 | N234 | | | | N234 | | |
| | | Secondary latex injection location | | | | | | |
| | control | Middle of first section | | | | Middle of second section | | |
| Calculated CB loading after 1st latex, phr | 56 | 62 | 70 | 75 | 80 | 85 | 90 | 95 |

TABLE 2A-continued

|  | CB grade | | | | | | | |
|---|---|---|---|---|---|---|---|---|
|  | N234 | N234 | | | | N234 | | |
|  | Secondary latex injection location | | | | | | | |
|  | control | Middle of first section | | | | Middle of second section | | |
| Prod. Rate*. Kg/hr | 262 | 255 | 247 | 232 | 227 | 211 | 208 | 203 |
| $1^{st}$ latex DRC**, % | 30.7 | 30.7 | 30.7 | 30.7 | 30.7 | 30.7 | 30.7 | 30.7 |
| $2^{nd}$ latex DRC, % | — | 30.7 | 30.7 | 30.7 | 30.7 | 30.7 | 30.7 | 30.7 |
| $2^{nd}$ latex DRC/total DRC, % | — | 31 | 33 | 35 | 36 | 38 | 39 | 40 |
| Residence time before $2^{nd}$ latex addition ($10^{-2}$ s) |  | 1.2 | 1.2 | 1.3 | 1.3 | 6.5 | 6.5 | 6.7 |
| Coherent coagulum | Yes, sometimes discontinuous | Yes | Yes | Yes | Yes | Yes | No | No |
| Measured CB loading, phr | 59.7 | 49.4 | 54.7 | 58.4 | 59.2 | 62.5 | 64.2 | 68.3 |

*Based on carbon black and first latex only
**Dry Rubber Content

TABLE 2B

|  | CB grade | | | | | | |
|---|---|---|---|---|---|---|---|
|  | N234 | N234 | N234 | | N234 | | |
|  | Secondary latex injection location | | | | | | |
|  | middle of first section | middle of second section | 1" upstream from the middle of $2^{nd}$ section | | 1" downstream from the middle of $1^{st}$ section | | |
| Calculated CB loading after $1^{st}$ latex, phr | 67 | 67 | 70 | 69 | 63 | 70 | 72 |
| Prod. Rate*. Kg/hr | 253 | 250 | 238 | 237 | 253 | 243 | 237 |
| $1^{st}$ latex DRC**, % | 30.7 | 30.7 | 30.7 | 30.7 | 30.7 | 30.7 | 30.7 |
| $2^{nd}$ latex DRC***, % | 14.1 | 14.1 | 14.2 | 14.2 | 14.0 | 14.8 | 14.8 |
| $2^{nd}$ latex DRC/total DRC, % | 18 | 11 | 12 | 12 | 11 | 19 | 20 |
| Residence time before $2^{nd}$ latex addition ($10^{-2}$ s) | 1.2 | 5.8 | 4.4 | 4.5 | 1.8 | 1.8 | 1.9 |
| Coherent coagulum | Yes | Yes | No | Yes | Yes | Yes | Yes |
| Measured CB loading, phr | 59.9 | 62.1 | 67 | 65 | 62.2 | 62.5 | 62.3 |

*Based on carbon black and first latex only
**Dry Rubber Content
***DRC adjusted by dilution with water

TABLE 2C

|  | CB grade | | | | | | |
|---|---|---|---|---|---|---|---|
|  | N234 | | N234 | | N234 | | |
|  | Secondary latex injection location | | | | | | |
|  | transition between first and second sections | | | control | transition between first and second sections | | |
| Calculated CB loading after $1^{st}$ latex, phr | 77 | 79 | 78 | 60 | 87 | 83 | 85 |
| Prod. Rate*. Kg/hr | 233 | 217 | 217 | 266 | 205 | 221 | 215 |
| $1^{st}$ latex DRC**, % | 30.7 | 30.7 | 30.7 | 28.7 | 28.7 | 28.7 | 28.7 |
| $2^{nd}$ latex DRC***, % | 13.6 | 13.6 | 16.0 | — | 15.1 | 15.1 | 15.1 |
| $2^{nd}$ latex DRC/total DRC, % | 23 | 25 | 28 | — | 24 | 22 | 23 |
| Residence time before $2^{nd}$ latex addition ($10^{-2}$ s) | 2.6 | 2.8 | 2.8 |  | 2.8 | 2.7 | 2.7 |
| Coherent coagulum | Yes | No | Yes | No | Yes | Yes | Yes |
| Measured CB loading, phr | 69.8 | 71.5 | 71.1 | 59.7 | 70.2 | 67.9 | 68.8 |

*Based on carbon black and first latex only
**Dry Rubber Content
***DRC adjusted by dilution with water

TABLE 2D

| | CB grade | | | | |
|---|---|---|---|---|---|
| | N234 | | | | |
| | Secondary latex injection location | | | | |
| | Transition between first and second sections | | | | |
| Calculated CB loading after 1st latex, phr | 78 | 80 | 82 | 83 | 80 |
| Prod. Rate*. Kg/hr | 222 | 221 | 218 | 215 | 214 |
| 1st latex DRC**, % | 28.7 | 28.7 | 28.7 | 28.7 | 28.7 |
| 2nd latex DRC***, % | 14.8 | 14.8 | 14.8 | 14.8 | 10.7 |
| 2nd latex DRC/total DRC, % | 21 | 22 | 22 | 22 | 17 |
| Residence time before 2nd latex addition ($10^{-2}$ s) | 2.6 | 2.7 | 2.7 | 2.7 | 2.7 |
| Coherent coagulum | Yes | Yes | Yes | Yes | Yes |
| Measured CB loading, phr | 62.6 | 66.1 | 65.9 | 66.9 | 66.4 |

*Based on carbon black and first latex only
**Dry Rubber Content
***DRC adjusted by dilution with water

TABLE 2E

| | CB grade | | | | | | | | | | |
|---|---|---|---|---|---|---|---|---|---|---|---|
| | Experimental Black 1 | | | | | | | | | | |
| | Secondary latex injection location | | | | | | | | | | |
| | Control | | 1" upstream from middle of 2nd section | | Transition between first and second sections | | | | | | |
| Calculated CB loading after 1st latex, phr | 49 | 42 | 57 | 52 | 59 | 70 | 55 | 62 | 62 | 79 | 82 |
| Prod. Rate*. Kg/hr | 272 | 295 | 244 | 323 | 240 | 211 | 243 | 229 | 230 | 199 | 207 |
| 1st latex DRC**, % | 28.7 | 29.6 | 29.6 | 29.6 | 29.6 | 29.6 | 29.6 | 29.6 | 29.6 | 29.6 | 29.6 |
| 2nd latex DRC***, % | — | — | 10.7 | 10.7 | 10.7 | 10.7 | 10.7 | 27.0 | 27.0 | 27.0 | 29.6 |
| 2nd latex DRC/total DRC, % | — | — | 14 | 10 | 14 | 16 | 9 | 21 | 21 | 36 | 38 |
| Residence time before 2nd latex addition ($10^{-2}$ s) | | | 4.0 | 3.1 | 2.4 | 2.6 | 2.4 | 2.4 | 2.4 | 2.7 | 2.6 |
| Coherent coagulum | No | Yes | Yes | Yes | Yes | Yes | Yes | Yes | Yes | Yes | Yes |
| Measured CB loading, phr | 46.3 | 49.3 | 51.4 | 48.4 | 51.6 | 54.3 | 51.3 | 51.7 | 51.4 | 55 | 54.9 |

*Based on carbon black and first latex only
**Dry Rubber Content
***DRC adjusted by dilution with water

TABLE 2F

| | CB grade | | | | | | | | |
|---|---|---|---|---|---|---|---|---|---|
| | Experimental Black 1 | | | | N134 | | | | N234 |
| | Secondary latex injection location | | | | | | | | |
| | Transition between first and second sections | | | | Control | Transition between first and second sections | | | |
| Calculated CB loading after 1st latex, phr | 80 | 84 | 87 | 90 | 60 | 83 | 83 | 87 | 65 |
| Prod. Rate*. Kg/hr | 286 | 288 | 292 | 302 | 280 | 296 | 303 | 279 | 496 |
| 1st latex DRC**, % | 30.3 | 30.3 | 30.3 | 30.3 | 29.8 | 29.8 | 29.8 | 29.8 | 59.3*** |
| 2nd latex DRC, % | 30.3 | 30.3 | 30.3 | 30.3 | — | 29.8 | 29.8 | 29.8 | 59.3*** |
| 2nd latex DRC/total DRC, % | 22 | 27 | 27 | 30 | — | 17 | 20 | 25 | 27 |
| Residence time before 2nd latex addition ($10^{-2}$ s) | 2.4 | 2.4 | 2.4 | 2.3 | — | 2.3 | 2.3 | 2.5 | 1.9 |
| Coherent coagulum | Yes | Yes | Yes | Yes | Yes | Yes | Yes | Yes | Yes |
| Measured (actual) CB loading, phr | 60.3 | 60.1 | 59 | 61.6 | 54.9 | 63.5 | 62.6 | 64.4 | 47.8 |

*Based on carbon black and first latex only
**Dry Rubber Content
***Latex Concentrate For successful examples incorporating secondary latex according to an embodiment of the invention, a masterbatch crumb exited the coagulum reactor as a continuous flow of coherent coagulum. Unsuccessful examples employing secondary latex may be contrasted with successful samples having similar operating conditions; in general, rubber recovered from such examples contained higher loadings of carbon black. Such samples emerged from the coagulum reactor as a discontinuous, sandy coagulum that caused the dewatering extruder to back up. Table 3, below, shows the maximum loading, i.e., the maximum filler content in the elastomer composite, in parts per hundred of rubber (phr), for which coherent coagulum was produced (that is, attempts to produce masterbatch crumb with higher filler content did not result in a coherent coagulum).

TABLE 3

| Injection point in diffuser | Maximum Carbon Black Loading, phr | | |
| --- | --- | --- | --- |
| | N234 | N134 | Experimental Black 1 |
| Control (no injection) | 59.7* | 54.9 | 49.3 |
| Middle of first section | 59.9 | — | — |
| 1" downstream from middle of first section | 62.5 | — | — |
| Transition between first and second section | 71.1 | 64.4 | 61.6 |
| 1" upstream from middle of the second section | 65 | — | 51.4 |
| Middle of second section | 62.1 | — | — |

*coagulum intermittently discontinuous

Figure 3:
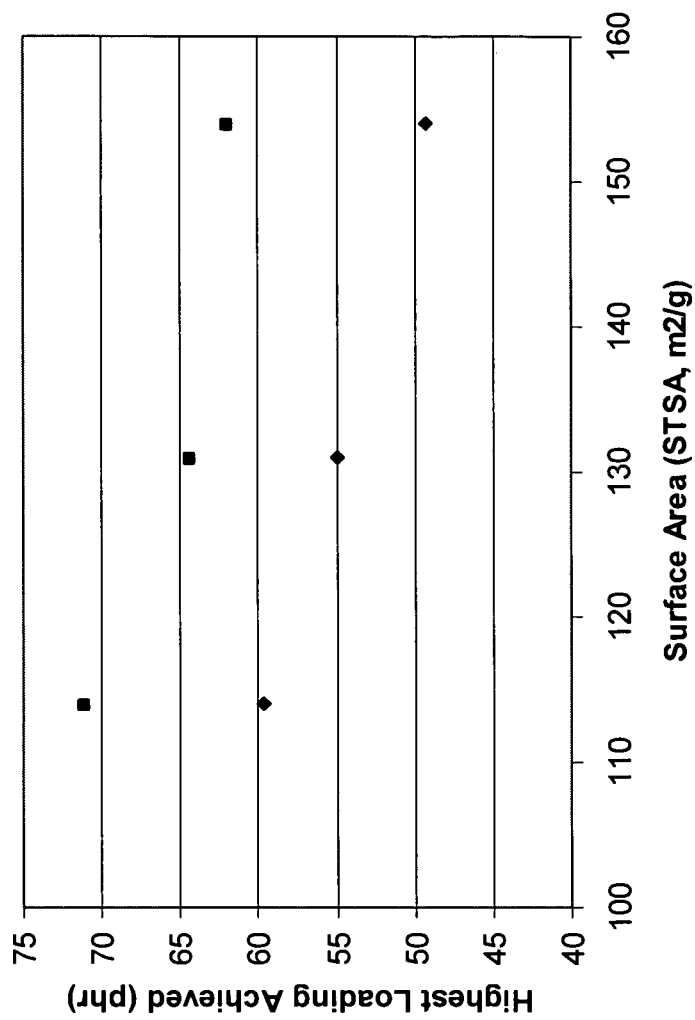
FIG. 3 is a graph comparing the highest loading of carbon blacks achieved during production of elastomer composites with secondary latex according to an exemplary embodiment of the invention (squares) and without secondary latex (diamonds), as a function of surface area (STSA).

The results show that operating variables such as the flow rate of the primary and secondary latex streams, the production rate, the proportion of secondary rubber, and the carbon black loading may be optimized with respect to one another to improve processability and increase filler loading. FIG. 3 shows the highest loadings achieved with and without secondary latex for the three grades of carbon black described above. The results show that while the morphology of the carbon black influences the maximum loading that can be achieved while producing coherent coagulum, the use of secondary latex provides a clear and consistent improvement in the achievable loading.

Dewatering

The masterbatch crumb discharged from the coagulum reactor was dewatered to 10-20% moisture with a dewatering extruder (The French Oil Machinery Company). In the extruder, the masterbatch crumb was compressed, and water squeezed from the crumb was ejected through a slotted barrel of the extruder.

Drying and Cooling

The dewatered coagulum was dropped into a continuous compounder (Farrel Continuous Mixer (FCM), Farrel Corporation) where it was masticated and mixed with 1 phr of antioxidant (N-(1,3-dimethylbutyl)-N'-phenyl-p-phenylenediamine (6PPD, Flexsys, St. Louis, Mo.). The moisture content of the masticated masterbatch exiting the FCM was around 1-2%. The masticated masterbatch was further masticated and cooled on an open mill to form a dried elastomer composite. The actual carbon black loading levels were determined by nitrogen pyrolysis (values listed on Tables 2A-2E) or TGA (values listed on Table 2F) on dried product. The dried elastomer composite was vulcanized; the mechanical properties of the vulcanized elastomer composite (e.g., tan delta, ratio of stresses at 300% and 100% strain) exhibited a variation with loading similar to that of vulcanized elastomer composites having lower filler loadings and prepared using the same techniques but without secondary latex. The use of secondary latex injection enables the manufacture of more highly loaded elastomer composites without sacrificing performance of the final rubber compounds.

Example 2

Filler Slurry Preparation

Silicon-treated carbon black (CRX™ 2000 ECOBLACK® silicon-treated carbon black, available from Cabot Corporation) is mixed with water and ground to form a slurry having a concentration of about 10-15 wt %. The slurry is fed to a homogenizer at an operating pressure of around 3000 prig to produce a finely dispersed carbon black slurry, and the slurry is introduced as a jet into the mixing zone. The slurry flow rate is adjusted to about 690-960 kg/hr (wet basis) to modify final filler loading levels in composites produced with field latex and to about 1145 kg/hr (wet basis) when latex concentrate is employed.

Primary Latex Delivery

Either field latex having a dry rubber content of about 27-31% or natural rubber latex concentrate is pumped to the mixing zone of the coagulum reactor. The latex flow rate is adjusted between about 320-790 kg/h (wet basis) in order to modify final filler loading levels.

Filler and Latex Mixing

The filler slurry and latex are mixed by entraining the latex into the filler slurry in a mixing portion (e.g., mixing portion 10) of a coagulum reactor similar to that shown in FIG. 1. During the entrainment process, the filler is intimately mixed into the latex and the mixture coagulates. Downstream of the mixing portion, a diffuser portion has a series of sections, each one having progressively higher diameter than the previous section, with a beveled transition portion in between sections.

Secondary Latex Delivery

Field latex is pumped into the coagulating mixture of filler slurry and latex at the transition between the first and second sections (e.g., 20a in FIG. 1) at a pressure of 3-8 bar starting at a rate of about 80 kg/hour (wet basis). The latex is injected at a right angle to the wall of the coagulum reactor. The pumping rate is gradually increased to at most 300 kg/hr (wet basis) until the coagulum emerging from the diffuser exhibits the desired morphology.

Dewatering

The masterbatch crumb discharged from the coagulum reactor is dewatered to 10-20% moisture with a dewatering extruder (The French Oil Machinery Company). In the extruder, the masterbatch crumb is compressed, and water squeezed from the crumb is ejected through a slotted barrel of the extruder.

Drying and Cooling

The dewatered coagulum is dropped into a continuous compounder (Farrel Continuous Mixer (FCM), Farrel Corporation) where it is masticated and mixed with 1 phr of antioxidant (N-(1,3-dimethylbutyl)-N'-phenyl-p-phenylenediamine (6PPD, Flexsys, St. Louis, Mo.) and 1.5 phr of a coupling agent (bis-(triethoxysilylpropyl)tetrasulfide (TESPT, Si-69, available from Evonik Industries, Essen, Germany)). The moisture content of the masticated masterbatch exiting the FCM is around 1-2%. The product is further masticated and cooled on an open mill to form a dried elastomer composite.

Example 3

Filler Slurry Preparation

A mixture of carbon black and silica (N234 carbon black, available from Cabot Corporation, and HiSil® 233 silica, available from PPG Industries, Pittsburgh, Pa.) is mixed with water and ground to form a slurry having a concentration of about 10-15 wt %, in which the ratio of carbon black to silica ranges from 60:40 to 80:20 by mass. The slurry is fed to a homogenizer at an operating pressure of around 3000 psig to produce a finely dispersed carbon black slurry, and the slurry is introduced as a jet into the mixing zone. The slurry flow rate is adjusted to about 690-960 kg/hr (wet basis) to modify final filler loading levels in composites produced with field latex and to about 1145 kg/hr (wet basis) when latex concentrate is employed.

Primary Latex Delivery

Either field latex having a dry rubber content of about 27-31% or natural rubber latex concentrate is pumped to the mixing zone of the coagulum reactor. The latex flow rate is adjusted between about 320-790 kg/h in order to modify final filler loading levels.

Filler and Latex Mixing

The filler slurry and latex are mixed by entraining the latex into the filler slurry in a mixing portion (e.g., mixing portion 10) of a coagulum reactor similar to that shown in FIG. 1. During the entrainment process, the filler is intimately mixed into the latex and the mixture coagulates.

Secondary Latex Delivery

Field latex is pumped into the coagulating mixture of filler slurry and latex at the transition between the first and second sections (e.g., 20a in FIG. 1) at a pressure of 3-8 bar starting at a rate of about 80 kg/hour (wet basis). The latex is injected at a right angle to the wall of the coagulum reactor. The pumping rate is gradually increased to at most 300 kg/hr (wet basis) until the coagulum emerging from the diffuser exhibits the desired morphology.

Dewatering

The masterbatch crumb discharged from the coagulum reactor is dewatered to 10-20% moisture with a dewatering extruder (The French Oil Machinery Company). In the extruder, the masterbatch crumb is compressed, and water squeezed from the crumb is ejected through a slotted barrel of the extruder.

Drying and Cooling

The dewatered coagulum is dropped into a continuous compounder (Farrel Continuous Mixer (FCM), Farrel Corporation) where it is masticated and mixed with 1 phr of antioxidant (N-(1,3-dimethylbutyl)-N'-phenyl-p-phenylenediamine (6PPD, Flexsys, St. Louis, Mo.) and 1.5 phr of a coupling agent (bis-(triethoxysilylpropyl)tetrasulfide (TESPT, Si-69, available from Evonik Industries, Essen, Germany)). The moisture content of the masticated masterbatch exiting the FCM is around 1-2%. The product is further masticated and cooled on an open mill to form a dried elastomer composite.

Example 4

Dry carbon black (N234, obtained from Cabot Corporation) was mixed with water and ground to form a slurry having a concentration of about 10-15 wt %. The slurry was fed to a homogenizer at an operating pressure of around 3000 psig to produce a finely dispersed carbon black slurry, and the slurry was introduced as a jet into the mixing zone. The carbon black flow rate (dry basis) is specified in Table 4, below.

Primary Latex Delivery

Field latex having a dry rubber content of about 27-31% was pumped to the mixing zone of the coagulum reactor. The delivery rate of primary rubber (dry rubber basis) into the mixing zone is listed in Table 4, below.

Carbon Black and Latex Mixing

The carbon black slurry and latex were mixed by entraining the latex into the carbon black slurry in a mixing portion (e.g., mixing portion 10) of a coagulum reactor similar to that shown in FIG. 1. During the entrainment process, the carbon black was intimately mixed into the latex and the mixture coagulated.

Secondary Latex Delivery

Field latex was pumped into the downstream, diffuser portion of the coagulum reactor at the transition between the first and second sections of the diffuser (e.g., 20a on FIG. 1), and the angle α (see FIG. 2) was 7 degrees. The length of the first section of the diffuser (e.g., 18a in FIG. 1) was varied between 4 and 8.5 inches; the resulting residence time before introduction of the secondary latex stream is listed in Table 4, along with the delivery rate of secondary rubber (dry rubber basis). The corresponding residence time for the Comparative Example (i.e., the residence time in the first section of the diffuser) was $1.8*10^{-2}$ s. The pumping rates of the primary and secondary latex and of the carbon black slurry were adjusted to achieve a production rate of 450-500 kg/hr (dry basis).

TABLE 4

| | Comparative Example | Example | | | | | |
|---|---|---|---|---|---|---|---|
| | | 4-1 | 4-2 | 4-3 | 4-4 | 4-5 | 4-6 |
| Carbon black flow rate (kg/hr, dry basis) | 153 | 167 | 197 | 192 | 197 | 195 | 195 |
| Primary rubber flow rate (kg/hr, dry rubber basis) | 222 | 189 | 209 | 194 | 221 | 186 | 259 |
| Secondary rubber flow rate (kg/hr, dry rubber basis) | 0 | 64 | 61 | 66 | 67 | 92 | 42 |
| Residence time before 2° elastomer ($10^{-2}$ s) | — | 1.8 | 1.9 | 2.4 | 3.0 | 2.4 | 2.2 |
| 2° elastomer/total elastomer (%) | 0 | 25.2 | 22.5 | 25.4 | 23.3 | 33.3 | 13.9 |
| Measured CB loading (phr) | 64.5 | 64.4 | 65.3 | 68 | 64.4 | 65.6 | 63.2 |

Figure 4:
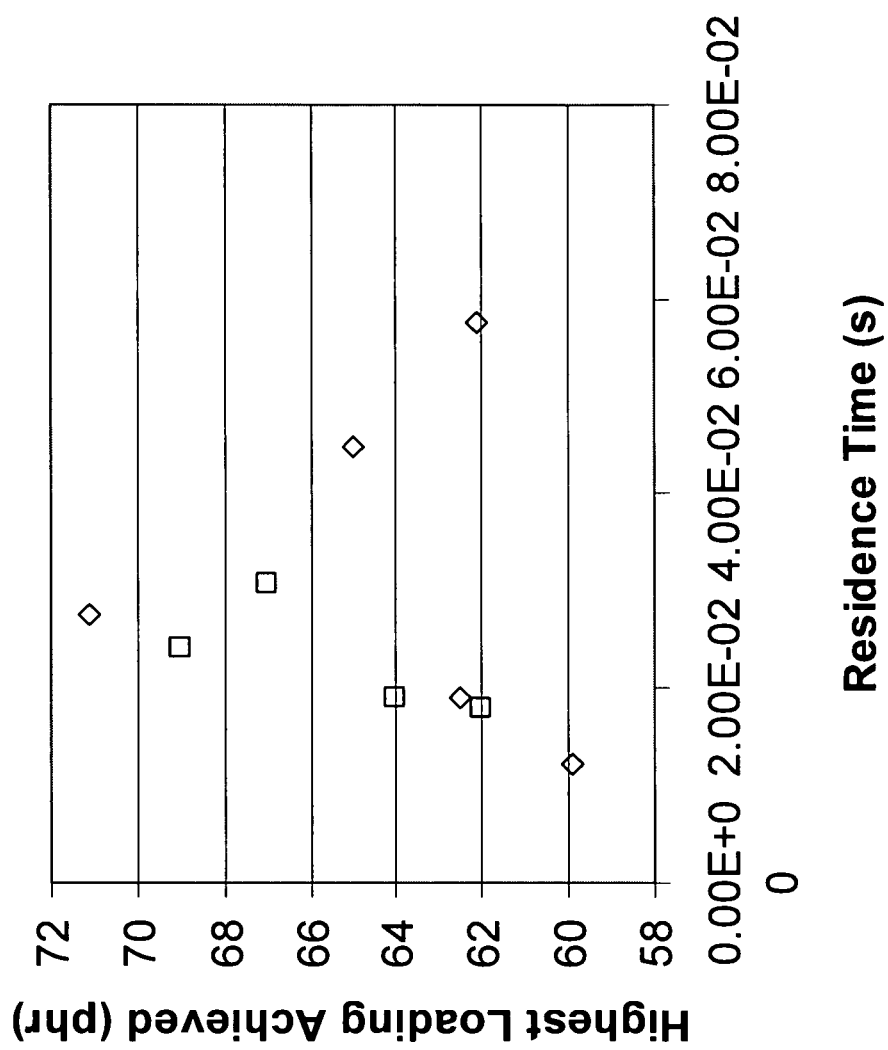
FIG. 4 is a graph showing the relationship of the highest loading of N234 carbon black achieved with respect to residence time for production of elastomer composite according to various embodiments of the invention (square—production rate from 450-500 kg/hr (dry basis); diamond—production rate from about 200-275 kg/hr (dry basis, based on primary latex and carbon black only)).

Results from Examples 4-1 through 4-4 are shown in FIG. 4. FIG. 4 clearly shows an optimum residence time for maximizing filler loading. Such a maximum is consistent with the theory described above. According to the theory, introduction of the secondary latex stream before substantial decoration of the latex particles causes the rubber particles in the secondary latex stream to also become decorated, rather than binding rubber-filler aggregates together, while the secondary latex stream is not completely mixed with the coagulating mixture if it is introduced too far downstream. In Examples 4-5 and 4-6, the injection rate of the secondary rubber flow was varied while maintaining a residence time similar to that of Example 4-3. The results are consistent with the theory described above; only a certain amount of secondary latex is required to bind together the discrete rubber-filler aggregates into a coherent coagulum, and additional secondary latex only dilutes the final product loading.

Dewatering

The masterbatch crumb discharged from the coagulum reactor was dewatered to 10-20% moisture with a dewatering extruder (The French Oil Machinery Company). In the extruder, the masterbatch crumb was compressed, and water squeezed from the crumb was ejected through a slotted barrel of the extruder.

Drying and Cooling

The dewatered coagulum was dropped into a continuous compounder (Farrel Continuous Mixer (FCM), Farrel Corporation) where it was masticated and mixed with 1 phr of antioxidant (N-(1,3-dimethylbutyl)-N'-phenyl-p-phenylenediamine (6PPD, Flexsys, St. Louis, Mo.). The moisture content of the masticated masterbatch exiting the FCM was around 1-2%. The product was further masticated and cooled on an open mill to form a dried elastomer composite. The actual carbon black loading levels were determined by TGA on the dried elastomer composite and are listed in Table 4. The dried elastomer composite was vulcanized; the mechanical properties of the vulcanized elastomer composite (e.g., tan delta, ratio of stresses at 300% and 100% strain) exhibited a variation with loading similar to that of vulcanized elastomer composites having lower filler loadings and prepared using the same techniques but without secondary latex. The use of secondary latex injection enables the manufacturing of more highly loaded elastomer composites without sacrificing performance of the final rubber compounds.

Example 5

This example demonstrates the improvements to the properties of vulcanized rubber compositions prepared with elastomer composites having high volume fractions of carbon black prepared according to exemplary embodiments of the invention, compared to the already improved properties of vulcanized rubber compositions based on elastomer composites having lesser volume fraction of carbon black prepared by a wet mix method used in Example 4 to prepare control samples and to vulcanized rubber compositions prepared by dry mixing.

Preparation of Masterbaches

Masterbaches A were prepared according to Example 1, as follows:

Masterbatch A1 corresponds to N234, measured CB loading of 66.1 phr, of Table 2D, Masterbatch A2 corresponds to Experimental Black 1, measured CB loading of 59 phr, of Table 2F, Masterbatch A3 corresponds to N134, measured CB loading of 64.4 phr, of Table 2F Masterbatches B were prepared with the same carbon black and the same field latex according to the wet mix method used in Example 4 to prepare control samples, as follows:

Masterbatch B1 includes 50 phr of N234,

Masterbatch B2 includes 49 phr of Experimental Black 1,

Masterbatch B3 includes 50 phr of N134,

Preparation of Rubber Compositions

The tests which follow are carried out in the following way: the diene elastomer and the reinforcing filler or the masterbatches including diene elastomers and reinforcing fillers were introduced into an internal mixer, 70% filled and having an initial vessel temperature of approximately 50° C., followed, after kneading for one minute, by the various other ingredients, with the exception of the sulphur and sulphenamide primary accelerator. Thermomechanical working (non-productive phase) was then carried out in one or two stages (total duration of the kneading equal to approximately 5 min), until a maximum "dropping" temperature of approximately 165° C. was reached.

The mixture thus obtained was recovered and cooled and then sulphur and sulphenamide accelerator were added on an external mixer (homofinisher) at 30° C., the combined mixture was mixed (productive phase) for 3 to 4 minutes.

The compositions were subsequently either calendered in the form of plaques (thickness of 2 to 3 mm), for the measurement of their physical or mechanical properties.

Rubber Compositions

Rubber compositions CA1 to CA3 and CB1 to CB3 were produced with masterbatches A1 to A3 and B1 to B3, respectively. Comparative rubber compositions CD1 to CD3 and CE1 to CE3 were fabricated using a dry mixing process from the same carbon blacks in dry form and solid natural rubber.

Thus all the compositions included 100 phr of natural rubber (whether introduced in the form of a masterbatch or in a solid form) and different grades of carbon black as shown in the following Table 5.

TABLE 5

| Composition | CD1 | CB1 | CE1 | CA1 | CD2 | CB2 | CE2 | CA2 | CD3 | CB3 | CE3 | CA3 |
|---|---|---|---|---|---|---|---|---|---|---|---|---|
| N234 (phr) | 50 | 50 | 66 | 66.1 | — | — | — | — | — | — | — | — |
| Experimental Black 1 (phr) | — | — | — | — | 49 | 49 | 59 | 59 | — | — | — | — |
| N134 (phr) | — | — | — | — | — | — | — | — | 50 | 50 | 64 | 64.4 |

All these compositions also include the additional ingredients shown in Table 6.

TABLE 6

| Ingredients | Quantity (phr) |
|---|---|
| 6 PPD | 2.0 |
| Stearic Acid | 2.5 |
| ZnO | 3.0 |
| CBS* (accelerator) | 1.2 |
| Sulfur | 1.2 |

*N-Cyclohexyl-2-benzothiazolesulphenamide (Flexsys: "Santocure" CBS)

Characterization of the Rubber Compositions

The diene rubber compositions were characterized before and after curing as indicated below.

1. Mooney Plasticity

Use was made of an oscillating consistometer as described in French Standard NF T 43-005 (1991). The Mooney plasticity measurement was carried out according to the following principle: the composition in the raw state (i.e., before curing) was moulded in a cylindrical chamber heated to 100° C. After preheating for one minute, the rotor rotated within the test specimen at 2 revolutions/minute and the working torque for maintaining this movement was measured after rotating for 4 minutes. The Mooney plasticity (ML 1+4) is expressed in "Mooney unit" (MU, with 1 MU=0.83 newton·meter).

2. Dispersion

In a known way, filler dispersion in rubber matrix can be represented by Z value, which was measured, after reticulation, according to the method described by S. Otto and Al in Kautschuk Gummi Kunststoffe, 58 Jahrgang, NR 7-8/2005, article titled "New Reference value for the description of Filler Dispersion with the Dispergrader 1000NT" according to standard ISO 11345.

The calculation of Z value is based on the percentage of undispersed area, as measured by the apparatus "disperGRADER+" provided with its procedure and its operating software "disperDATA" by the Dynisco company according to the equation:

Z=100−(percentage of undispersed area)/0.35

The percentage of undispersed area was measured using a camera with a light source at an angle of 30° with respect to the observation surface. Light dots are associated with filler and agglomerates, while the dark background is associated the rubber matrix; numerical treatment transforms the image into a black and white image, and allows the determination of the percentage of undispersed area, as described by S. Otto in the above mentioned document.

The higher the value Z, the better the dispersion of the filler in the rubber matrix (a Z value of 100 corresponding to perfect mix and a Z value of 0 to poorer mix)

3 Rheometry

The measurements were carried out at 150° C. with an oscillating disc rheometer, according to Standard DIN 53529—part 3 (June 1983). The change in the rheometric torque as a function of time describes the change in the stiffening of the composition as a result of the vulcanization reaction. The measurements are processed according to Standard DIN 53529—part 2 (March 1983): "ti" is the induction period, that is to say the time necessary for the start of the vulcanization reaction; to (for example t90) is the time necessary to achieve a conversion of α %, that is to say α % (for example 90%) of the difference between the minimum and maximum torques. The conversion rate constant, denoted K (expressed in $min^{-1}$), which is first order, calculated between 30% and 80% conversion, which makes it possible to assess the vulcanization kinetics, was also measured.

4. Tensile Tests

These tensile tests make it possible to determine the elasticity stresses and the properties at break. Unless otherwise indicated, they were carried out in accordance with French Standard NF T 46-002 of September 1988. The nominal secant moduli (or apparent stresses, in MPa) were measured in second elongation (i.e., after a cycle of accommodation to the degree of extension expected for the measurement itself) at 10% elongation (denoted M10), 100% elongation (denoted M100) and 300% elongation (denoted M300).

The properties measured before and after curing at 150° C. for 40 minutes are given in the Tables 7, 8 and 9 (each table corresponding to one specific carbon black grade).

TABLE 7

| | Composition (with N234): | | | | | |
|---|---|---|---|---|---|---|
| | CD1 | CB1 | Improvement (%) | CE1 | CA1 | Improvement (%) |
| Properties before curing | | | | | | |
| Mooney (MU) | 45 | 38 | 15 | 67 | 46 | 31 |
| Curing Properties | | | | | | |
| $T_{99}$ (min) | 55 | 48 | 13 | 54 | 43 | 20 |

TABLE 7-continued

| | Composition (with N234): | | | | | |
|---|---|---|---|---|---|---|
| | CD1 | CB1 | Improvement (%) | CE1 | CA1 | Improvement (%) |
| K ($min^{-1}$) | 0.11 | 0.14 | 27 | 0.11 | 0.15 | 36 |
| Properties after curing: | | | | | | |
| Z value | 60 | 84 | 40 | 68 | 96 | 41 |
| M300 (MPa) | 2.92 | 3.22 | 10 | 4.27 | 4.89 | 14 |
| M300/M100 | 1.25 | 1.41 | 13 | 1.21 | 1.46 | 21 |

TABLE 8

| | Composition: (with Experimental Black 1) | | | | | |
|---|---|---|---|---|---|---|
| | CD2 | CB2 | Improvement (%) | CE2 | CA2 | Improvement (%) |
| Properties before curing | | | | | | |
| Mooney (MU) | 52 | 43 | 17 | 60 | 46 | 23 |
| Curing Properties | | | | | | |
| $T_{99}$ (min) | 59 | 52 | 17 | 60 | 45 | 25 |
| K ($min^{-1}$) | 0.10 | 0.12 | 20 | 0.10 | 0.14 | 40 |
| Properties after curing: | | | | | | |
| Z value | 57 | 77 | 35 | 53 | 86 | 62 |
| M300 (MPa) | 2.96 | 3.33 | 12 | 3.48 | 4.04 | 16 |
| M300/M100 | 1.29 | 1.52 | 18 | 1.27 | 1.52 | 20 |

TABLE 9

| | Composition: (with N134) | | | | | |
|---|---|---|---|---|---|---|
| | CD3 | CB3 | Improvement (%) | CE3 | CA3 | Improvement (%) |
| Properties before curing | | | | | | |
| Mooney (MU) | 47 | 37 | 21 | 69 | 46 | 33 |
| Curing Properties | | | | | | |
| $T_{99}$ (min) | 55 | 47 | 14 | 55 | 45 | 18 |
| K ($min^{-1}$) | 0.11 | 0.14 | 27 | 0.10 | 0.14 | 40 |
| Properties after curing: | | | | | | |
| Z value | 65 | 81 | 25 | 58 | 95 | 64 |
| M300 (MPa) | 2.91 | 2.57 | 12 | 4.19 | 4.97 | 19 |
| M300/M100 | 1.30 | 1.21 | 7 | 1.26 | 1.54 | 22 |

It can be seen that all compositions prepared by a wet mix method (CA1 to CA3 and CB1 to CB3), when compared with compositions having the same ingredients but prepared by dry mix method (CD1 to CD3 and CE1 to CE3), exhibited an improvement of all the properties mentioned above: dispersion (shown by Z value), processability (Mooney), rheometry ($T_{99}$ and K) and reinforcement (M300 and M300/M100). Thus, the higher loading of carbon black enabled by the processes of the invention preserves the improvements obtained by a wet mix, mechanical coagulation method of the type described in U.S. Pat. No. 6,048,923.

Moreover, when comparing compounds prepared by a wet mix method to those prepared by a dry mix method, the percent of improvement obtained at high loadings of carbon black is, for all the properties discussed above, higher that what was obtained at lower loadings of carbon black.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of producing a coagulated latex composite, comprising:
   flowing a coagulating mixture of a first elastomer latex comprising a first elastomer and a particulate filler slurry along a conduit; and
   introducing a second elastomer latex comprising a second elastomer into the flow of the coagulating mixture.

2. The method of claim 1, further comprising, before flowing the coagulating mixture, generating the coagulating mixture by feeding a continuous flow of the first elastomer latex to a mixing zone of a coagulum reactor defining an elongate coagulum zone extending from the mixing zone to a discharge end and comprising the conduit, and feeding a continuous flow of a fluid comprising particulate filler under pressure to the mixing zone of the coagulum reactor to form the coagulating mixture.

3. The method of claim 1, wherein the conduit comprises a first conduit portion having a first diameter, a second conduit portion having a second diameter greater than the first diameter, and a transition zone therebetween having a diameter that increases from the first diameter to the second diameter, wherein flowing comprises flowing the coagulating mixture into the second conduit portion from the first conduit portion, and introducing comprises introducing the second elastomer latex into the coagulating mixture in the transition region.

4. The method of claim 3, wherein flowing the coagulating mixture comprises flowing the coagulating mixture through the transition region under conditions of turbulent flow.

5. The method of claim 1, wherein the amount of the second elastomer in the composite is from about 0.5 wt % to about 50 wt %.

6. The method of claim 1, wherein the second elastomer is a synthetic elastomer or natural rubber.

7. The method of claim 1, wherein the particulate filler comprises a carbon black having a surface area of at least 95 $m^2/g$ as measured by STSA and a dibutyl phthalate adsorption of at least 80 mL/100 g, and wherein the coagulated latex composite comprises at least 65 phr of the carbon black.

8. The method of claim 1, wherein the particulate filler comprises a carbon black having a surface area of at least 68 $m^2/g$ as measured by STSA and a dibutyl phthalate adsorption of at least 60 mL/100 g, and wherein the coagulated latex composite comprises at least 70 phr of the carbon black.

9. The method of claim 1, wherein the particulate filler comprises a carbon black having a dibutyl phthalate adsorption of at least 60 mL/100 g, wherein the carbon black has a surface area and is present in the coagulated latex composite in an amount satisfying $L \geq -0.26*S+94$, where L is the amount of the carbon black in the coagulated latex composite in parts per hundred of rubber (phr) and S is the surface area in $m^2/g$ as measured by STSA.

10. A method for producing a coagulated latex composite, the method comprising:
    generating a flow of a coagulating mixture of a first elastomer latex comprising a first elastomer and a particulate filler slurry having a first degree of turbulence;
    causing the first degree of turbulence to change to a second degree of turbulence; and
    introducing a second elastomer latex into the coagulum at a location where the coagulum flow has the second degree of turbulence.

11. The method of claim 10, wherein generating a flow comprises feeding a continuous flow of the first elastomer latex to a mixing zone of a coagulum reactor defining an elongate coagulum zone extending from the mixing zone to a discharge end and feeding a continuous flow of the particulate filler slurry under pressure to the mixing zone of the coagulum reactor to form the coagulating mixture.

12. The method of claim 10, wherein the amount of the second elastomer in the composite is from about 0.5 wt % to about 50 wt %.

13. The method of claim 10, wherein the second elastomer is a synthetic elastomer or natural rubber.

14. The method of claim 10, wherein the particulate filler comprises a carbon black having a surface area of at least 95 $m^2/g$ as measured by STSA and a dibutyl phthalate adsorption of at least 80 mL/100 g, and wherein the coagulated latex composite comprises at least 65 phr of the carbon black.

15. The method of claim 10, wherein the particulate filler comprises a carbon black having a surface area of at least 68 $m^2/g$ as measured by STSA and a dibutyl phthalate adsorption of at least 60 mL/100 g, and wherein the coagulated latex composite comprises at least 70 phr of the carbon black.

16. The method of claim 10, wherein the particulate filler comprises a carbon black having a dibutyl phthalate adsorption of at least 60 mL/100 g, wherein the carbon black has a surface area and is present in the coagulated latex composite in an amount satisfying $L \geq -0.26*S+94$, where L is the amount of the carbon black in the coagulated latex composite in parts per hundred of rubber (phr) and S is the surface area in $m^2/g$ as measured by STSA.

17. An apparatus comprising a coagulum reactor having a mixing portion and a generally tubular diffuser portion extending with progressively increasing cross-sectional area from an entry end to an open discharge end, the apparatus further characterized by a delivery tube terminating in an injection orifice adapted and constructed to deliver a fluid to the diffuser portion at a portal disposed between the entry end and the open discharge end.

18. The apparatus of claim 17, wherein the diffuser portion comprises:
    a first diffuser section having a first diameter;
    a second diffuser section having a second diameter, the second diameter being larger than the first diameter; and
    a transition region between said first and second sections and having a diameter that increases from the first diameter to the second diameter, wherein the portal is disposed in the transition region.

19. The apparatus of claim 18, further comprising at least one additional diffuser section disposed downstream of the second diffuser section and having a diameter larger than the second diameter or at least one additional diffuser section disposed between the mixing portion and the first diffuser portion and having a diameter smaller than the first diameter, or both.

* * * * *